(12) United States Patent
Borjanin et al.

(10) Patent No.: US 11,890,583 B2
(45) Date of Patent: Feb. 6, 2024

(54) STAND-ALONE VALVE, ADAPTER AND AERATOR FOR USE WITH A SUCTION PUMP

(71) Applicant: Airtender Works B.V., Zoetermeer (NL)

(72) Inventors: Dalibor Borjanin, Nieuwerkerk aan den IJssel (NL); Robert Franciscus Van Der Hulst, Leiden (NL); Rui Medeiros Santos, Rotterdam (NL)

(73) Assignee: Airtender Works B.V., Zoetermeer (NL)

( * ) Notice: Subject to any disclaimer, the term of this patent is extended or adjusted under 35 U.S.C. 154(b) by 0 days.

(21) Appl. No.: 17/709,986

(22) PCT Filed: Oct. 2, 2020

(86) PCT No.: PCT/NL2020/050610
§ 371 (c)(1),
(2) Date: Mar. 31, 2022

(87) PCT Pub. No.: WO2021/066653
PCT Pub. Date: Apr. 8, 2021

(65) Prior Publication Data
US 2022/0410086 A1 Dec. 29, 2022

(30) Foreign Application Priority Data

Oct. 3, 2019 (NL) ...................................... 2023947

(51) Int. Cl.
*B01F 23/23* (2022.01)
*B01F 23/231* (2022.01)
(Continued)

(52) U.S. Cl.
CPC ...... *B01F 23/23123* (2022.01); *B01F 23/231* (2022.01); *B01F 23/236* (2022.01); *B01F 2101/17* (2022.01)

(58) Field of Classification Search
CPC .......................... B01F 23/231; B01F 23/23123
See application file for complete search history.

(56) References Cited

U.S. PATENT DOCUMENTS

| | | | |
|---|---|---|---|
| 4,494,452 A | * | 1/1985 | Barzso ................ B01F 23/2361 99/323.1 |
| 5,332,095 A | | 7/1994 | Wu |

(Continued)

FOREIGN PATENT DOCUMENTS

| | | |
|---|---|---|
| DE | 29604406 U1 | 10/1996 |
| EP | 0245664 A2 | 11/1987 |
| WO | 2017176606 A1 | 10/2017 |

OTHER PUBLICATIONS

International Search Report and Written Opinion—PCT/NL2020/050573—dated Nov. 2, 2020.

*Primary Examiner* — Robert A Hopkins
(74) *Attorney, Agent, or Firm* — Banner & Witcoff, Ltd.

(57) ABSTRACT

There is disclosed a stand-alone, independent and re-usable valve that can be mounted to a conventional food container, such as a food bag, and can be coupled to a suction pump. The valve has a first part for insertion into the food container and a second part for mounting onto the first part with a wall of the food container in between, to obtain an air-tight closure of the valve. Further, an adapter is provided that can cooperate with a single type of coupling element for a suction pump at one end and can cooperate with various types of valves at another end. Additionally, an aerator is provided that can be coupled to a suction pump operating in a blowing mode for aerating liquid.

12 Claims, 19 Drawing Sheets

(51) Int. Cl.
  *B01F 23/236* (2022.01)
  *B01F 101/17* (2022.01)

(56) References Cited

U.S. PATENT DOCUMENTS 8,567,305 B2 * 10/2013 Bregman .......... B01F 23/23123
                                                 261/DIG. 7
2003/0047700 A1   3/2003 Motonaka et al.

* cited by examiner

STAND-ALONE VALVE, ADAPTER AND ADAPTER FOR USE WITH A SUCTION PUMP

CROSS-REFERENCE TO RELATED APPLICATIONS

This application is a U.S. National Stage application under 35 U.S.C. § 371 of International Application PCT/NL2020/050610 (published as WO 2021/066653 A1), filed Oct. 2, 2020, which claims the benefit of priority to Application NL 2023947, filed Oct. 3, 2019. Benefit of the filing date of these prior applications is hereby claimed. Each of these prior applications is hereby incorporated by reference in its entirety.

The invention relates to accessories for use with a suction pump such as a vacuum pump. In particular, an accessory such as a valve or an adapter or an aerator that can be used in combination with a vacuum pump and, for example, a receptacle.

For example, it is known to use vacuum bags in combination with a suction apparatus, such as a suction pump, in particular a vacuum pump. A vacuum bag is often used to store food, or in food preparation, e.g. in sous-vide cooking. A vacuum bag can be single use bag that can be vacuumised and sealed by a vacuum apparatus. Such an apparatus however is relatively bulky and cannot be used for other applications. There is also known to provide bags with an integrated valve which valve can cooperate with a dedicated associated vacuum apparatus such as a vacuum pump. Such a vacuum bag has closure means separate from the valve and is often not re-usable. Such a vacuum bag however is rather expensive in manufacturing and distribution, and also rather vulnerable during use. The position where the valve is integrated can be sensitive to damage and/or rupture.

It is therefore an object of the invention to provide for a solution that obviates at least one of the above mentioned drawbacks. In particular, a more cost effective solution for the use of a vacuum bag is aimed for.

Thereto, the invention provides for a stand-alone re-usable valve according to claim 1.

Further, it is known that various vacuum pumps are available, each vacuum pump having a dedicated coupling end for coupling with a specific associated valve. A drawback is that a specific type of vacuum pump can only be used with a specific type of associated valve. This may limit the possibilities of use of a vacuum pump. Therefore, there is a need to provide for a more flexible use of a vacuum pump. Thereto, the invention provides for an adapter.

Another well-known process in food and beverage preparation is aeration of the food or beverage, such as foaming or oxidation. In particular in wine serving, the wine is often mixed with air to accelerate the wine oxidation and/or to let the wine breathe. This process is also known as aerating. However, such aerating is difficult to control, and/or the known aerators are often large, bulky devices either for use with the bottle, or for use with a single glass or carafe. There is thus a need for improving aeration, in particular when use is made of a dual-use vacuum pump. A dual-use vacuum pump is a pump that can not only suck air, but also blow air. Such a blowing mode can optimally be used for aeration of food and/or beverages. In particular, an accessory can be provided that can be used in combination with a dual-use vacuum pump for aerating liquid.

By providing a stand-alone, re-usable valve that can be connected at one end to a food receptacle and at another end to a vacuum pump, the valve can be provided as a single device independent of any type of receptacle or container. Such a valve can thus be used in combination with any type of readily available bag or container or jar, providing for a more cost effective solution than a bag or container with an integrated valve. Also, by providing the valve as a stand-alone device, the valve can be easily re-used. After use with a certain bag or container or receptacle, the valve can be removed from the food container, may be cleaned and may be re-used on another food container. The valve can be used in combination with a certain type of vacuum pump, or in combination with the adapter provided, with any type of vacuum pump.

Advantageously, the valve comprises a base part for coupling with the container, and a top part for coupling with the vacuum pump. The top part and the base part are arranged for connecting to each other as well, preferably with a wall of the food container in between, to provide a fluid connection between the food container and a vacuum pump, when coupled, through the valve. It is noted that the term food container or food receptacle is used in this disclosure for any type of food bag, food jar, food box or food container and many more. The terms are also interchangeable. The food container that can be used in combination with the valve is preferably a food container that can be sealingly closed, such as a bag with a zip, or a jar with a lid.

The base part of the valve is configured for positioning inside of the container. For example, the base part can be inserted in a food bag, or can be connected to one side of a wall of a container, e.g. one side of a lid of a container. The base part further comprises a channel that passes through the base part from one side to another side, in particular from one, inner, side facing the interior of the container, when the base part is inserted in the container, to the other side opposite the inner side facing the wall of the container, when in use. The channel preferably ends at or near the puncture in the wall of the container, such that a fluid connection can be established between the interior of the container and the puncture for, in use, allowing air to be removed out of the container. To effectively allow air to flow towards the puncturing element, a bottom side of the base part can be provided with ribs, preferably radially extending ribs, wherein the space between the ribs provide for a part of the channel in which air can flow from, in use, the interior of the container towards the puncturing element. When providing an arrangement of ribs at a bottom side of the base part, wherein a channel is provided between the ribs, a channel entry can be formed at a side of the base part, such that, even when the bottom side of the base part is closed by a wall of the container, there can still a fluid connection be established between the interior of the container and the other end of the channel at the puncturing element.

The base part may comprise a puncturing element for making a puncture in a wall of the food container. Through such puncture air can then leave the container when sucked out of the container by the vacuum pump.

The top part of the valve is configured for mounting onto the base part, preferably with the wall of the container in between, such that the fluid connection that the base part established, in use, between the interior of the container and the puncture in the wall of the container, can be fluidly connected to the top part. The top part also comprises at least one channel through the top part, the at least one channel extending from one side of the top part, facing the base part, to an opposite side of the top part, facing outwardly. The channel may thus provide for a fluid connection between one side of the top part, that in use is mounted to the base part, and the outer environment of the top part and of the container, to which the valve in use is mounted. The puncturing element can be provided on the base part or can be provided on the top part. So, the puncture in the wall of the container may be made by the base part inserted inside of the container, or may be made by the top part from an outside of the container. Alternatively, the puncture can be made by the user with a separate tool, thereby obviating the need of a puncturing element in the valve.

Advantageously, in the channel a valve element is provided which valve element is adaptable between a closed position for closing off the top part channel, and an open position for allowing air to pass through the top part channel. The valve element can be integrated to the base part or to the top part, in particular in the channel of the base part or in the channel of the top part. Alternatively, the valve element can be a separate element, that can be inserted either in the channel of the base part or in the channel of the top part. The valve element can be provided on the base part or on the top part. The valve element may be a duck bill valve, a relatively simple, cost effective though efficient single-way valve. Alternatively, the valve can be an umbrella valve. The valve can thus be easily mounted to the food container, and, after use, also easily be removed and re-used. Thus, a compact valve that is stand-alone, meaning that it is not integrated to a food container, and re-usable is provided. By using this valve, also, a conventional, commonly available food container, e.g. food bag or a food jar. This saves time and costs for the consumer.

Advantageously, the top part channel is arranged to engage with the bottom part channel, such that, when the top part is mounted on the base part, a fluid connection is obtained passing through the valve from one side, in use an inner side of the container, to another side, in use an outside of the container. As such, a fluid connection can be provided between one side of the valve, through the channel to another side of the valve, in use, from an interior of the food container to outside of the food container respectively. So, with a relatively simple, stand-alone and re-usable valve, and a vacuum pump, a commonly available food container can be turned into a vacuum container, typically, for storing or preservation of food.

The base part may be provided with an upwardly extending sleeve surrounding the puncturing element. Such sleeve may provide for guidance of the top part when mounting the top part onto the base part, and/or may provide for protection of the puncturing element as well. The puncturing element may be relatively vulnerable, e.g. during storage or cleaning, and such a sleeve may provide for some protection to the puncturing element and/or to the user handling the base part.

Advantageously, a wall of the top part channel is configured to engage with a wall of the sleeve of the base part when mounting the top part onto the base part, preferably to clampingly engage. By providing an engagement of the wall of the top part with the sleeve of the base part, a firm coupling can be obtained, and with a clamping engagement a more firm coupling can be obtained. When the container is a food bag, a wall of the bag is advantageously between the top part all and the base part sleeve wall to provide an air-tight engagement. The food bag wall may then serve as a gasket for air-tight mounting of the valve to the food container. When the valve is used e.g. on a lid of a jar, the lid typically is punched by the puncturing element, and if present by the sleeve surrounding the puncturing element.

Further, the top part may comprise a skirt, wherein an under side of the skirt is arranged to, in use, rest onto the base part. This may provide for a more stable mounting of the top part onto the bottom part. Advantageously, the under side of the skirt is resilient to provide for a sealing engagement of the top part onto the bottom part. When the food container is a food bag, the resilient under side may aid to protect the vulnerable wall of the food bag against rupture, it is intended that the wall is punched by the puncturing element and remains intact elsewhere. Further, when the food container is a jar, and the valve is for example mounted to the lid of the jar, then the resilient end of the skirt can provide for air-tight engagement of the top part to the lid.

Advantageously, the top part is further configured to engage with a vacuum pump, in particular with a coupling element of a vacuum pump, more in particular with an intermediate element coupling the valve with the coupling element of the vacuum pump, such that the coupling element of the vacuum pump sits over the valve element or the intermediate element sits over the valve element respectively. For example, the top part may be provided with a seat on which the vacuum pump, or a coupling element of a vacuum pump, or an intermediate element, can sit, as to surround and/or cover the valve element, such that, when the vacuum pump is in operation, the valve element can be opened and the air can be sucked out of the container to which the valve is mounted. By operating the vacuum pump in the vacuum mode, air is sucked out of the container towards the vacuum pump. Due to this sucking of air towards the vacuum pump, the valve element adapts itself to the open position, e.g. the duckbill valve opens its beak, or an umbrella valve moves away from its seat to allow air to pass.

Advantageously, the base part is configured for insertion into an interior of a container, wherein the valve element is receivable to or integrated with the base part, wherein the top part is arranged for mounting on the bottom part, such that, in use, a wall of the container is between the base part with valve element and the top part. By providing such arrangement, the valve element, in use, can remain in the container, and is relatively protected by the top part surrounding it. Thus, a robust and reliable vacuum valve can be obtained. More advantageously, the top part further may be provided with the puncturing element. Thus, the wall of the container is only punctured when the top part is mounted onto the base part.

The intermediate element preferably is arranged to engage at one side with the valve, and at another side can be connected with the coupling element of the vacuum pump. Between the intermediate element and the coupling element of the vacuum pump, a liquid overflow container can be provided that acts as an overflow reservoir for receiving any liquid that may pumped up from the food container that is being vacuumised. As such, it can be prevented that liquid reaches the vacuum pump which may jeopardize the functioning of the vacuum pump.

For example, the base part and/or the top part can be manufactured by injection moulding, in particular wherein the top part is manufactured by two component injection moulding. By manufacturing the base part and/or the top part by injection moulding, the parts can be manufactured relatively cost effective. When the top part is provided with a resilient layer or a resilient tip or skirt, it can be considered to manufacture the top part by two component injection moulding as to manufacture the rigid and the resilient elements of the top part as a single product. For example, the valve element can be a resilient element as well, and may thus be manufactured together with the whole of the top part.

In a further aspect of the invention, there is provided for a system of a food container and a valve. The valve can be mounted to the container, in particular the base part of the valve can be arranged inside of the food container such that the puncturing element punctures a wall of the food container to provide a fluid connection through the base part channel between the inside of the container and the outside of the container, wherein the top part is mounted on the base part such that the top part channel is engaged to the bottom part channel.

In a further aspect of the invention, there is provided a method for vacuumising a food container, such as a food bag or a food jar, the method comprising: providing a valve having a base part and a top part; mounting the base part inside of the food container, such that the puncturing element punctures a wall of the food container to provide a fluid connection through the base part channel between the inside of the container and the outside of the container; mounting a top part onto the base part from the outside of the container, such that the top part channel engages the bottom part channel to provide a fluid connection between the inside of the container and the outside of the container, when the valve element is in open position; positioning a vacuum pump, in particular a coupling element of a vacuum pump, onto the top part over the valve element to allow air to be pumped out of the container to create a negative pressure inside of the container. According to this method, the user can easily vacuumise a commonly available food container by mounting the valve according to the invention to the food container and couple it to a vacuum pump. The vacuum pump can be a commonly available vacuum pump as well, or can be a vacuum pump as described in application NL2023846. Such a commonly available vacuum pump can be coupled to the valve either directly or via an adapter.

As a further aspect of the invention, an adapter is provided for engagement of a vacuum pump of a predefined type with any type of valve, the adapter comprising: a flexible cap that at an under side is provided with a recess to fit over any type of valve and at an upper side is provided with an opening; an arm arranged at one side to engage with the opening of the cap and at another side with a coupling element of the predefined type of vacuum pump, the arm comprising a fluid channel; a rigid shell surrounding the flexible cap. By providing such an adapter, it is possible to provide an interface between a specific type of coupling element of a vacuum pump, and almost any type of valve. The specific type of coupling element is understood to be a cylindrical shaped or tube shaped coupling element, that typically has an outer diameter of between about 5 mm and about 25 mm, more preferably between about 7 mm and about 15 mm, more preferably about 10 mm. The tube shaped coupling element can be provided as a part of the vacuum pump, or can be provided at an end of a flexible hose connectable to the vacuum pump. It is preferred that a free end of the coupling element, namely the end that is configured for engaging a valve, has a tubular shape over about 3 mm to about 7 mm axial length. More further away from the lower end, towards the vacuum pump, the coupling element may be tubular as well, or may flare outwardly, or may become otherwise shaped. As such, the coupling element is at one end connectable to the vacuum pump and at another free end configured for engagement to a valve. The adapter is provided to allow this specific type of tube shaped coupling element to be engageable to various types of valves via such an adapter.

By providing such a flexible cap, many types of valves can be covered and due to the resiliency of the cap, a sealing engagement to such a valve can be obtained. By further providing a rigid shell over the flexible cap, the adapter can be easy to handle and, when subject to a negative pressure, can remain in shape while the resilient cap can be allowed to deform.

Further, the adapter may be provided with an arm that is at one side engageable to the opening in the adapter and at another engageable with the coupling element of the vacuum pump. By providing the arm, the coupling element can be connectable to the arm, instead of being directly connectable into the opening. This provides for a more easy coupling of the coupling element to the adapter. Advantageously, the arm is rotatable mounted to the adapter, in particular to the opening of the adapter, which provides even for a more easy coupling of the coupling element to the adapter, as well as for a more easy use of the adapter. The arm may be rotatable with respect to the adapter under the influence of gravity, e.g. the arm may rotate downwardly when the adapter is positioned on the container and the arm is coupled to the adapter. As such, the arm may also further move the adapter downwardly onto the container to more effectively secure the adapter to the container. The arm may autonomously search the most stable position, which also provides for a more reliable coupling with the vacuum pump. Alternatively, the arm can be directly connected to some types of valves.

According to a further aspect of the invention, an aerator for aerating liquid, such as wine, wherein the aerator is configured for cooperation with a dual-use vacuum pump, the aerator comprising: a cooperation element that is arranged for connection to the vacuum pump; a tube connected to the cooperation element at one end and ending at an other, free end having an outlet, wherein the free end is configured for at least partly submerging in the liquid such that air can flow out of the outlet to the liquid. By providing such an aerator, air can be introduced to liquid such as wine or milk etc. with a dual-use vacuum pump, in particular when the pump is operating in blowing mode. By aerating the liquid, such as wine, typically the taste of the liquid can be improved. For some liquids, by aerating the liquid, foam can be created, such as e.g. with milk or cream.

By providing an aerator with a tube shaped element having a channel extending between an inlet for connection to the vacuum pump and an outlet for at least partly submerging into the liquid to be aerated, a relatively simple accessory can be provided that can be connected to the vacuum pump and can blow air into the liquid for aerating the liquid. The outlet is configured for allowing air to exit the tube into the liquid. The inlet is configured for connection to the vacuum pump. For example, the inlet can connect directly to the vacuum pump, but may alternatively couple with a coupling element of the vacuum pump. The connection of the inlet with the vacuum pump can be directly or indirectly.

The outlet can be a relatively simple outflow opening, e.g. a single opening at the free end of the tube, or can be a complex mesh-type filter that is arranged at the free end of the tube, or any configuration in between. Advantageously, the outlet is configured as a filter for allowing air to exit the aerator. The filter can be provided as a number of holes in the free end of the tube, or can be provided as a separate filter element that is removable connectable to the free end of the tube. The filter can have a rather fine mesh, e.g. meshes in an order of magnitude of microns, for example between about 1 micron to about 50 micron, preferably between about 1 micron to about 20 micron, more preferably between about 3 micron and about 5 micron. Openings or holes in the filter may be larger, e.g. between about 0.5 mm to about 1 mm. The finer the mesh, the finer the air bubbles that are created, and the more intense the aeration of the liquid may be, which may result in a more intense taste or a finer foam.

Additionally, in the tube a one-way valve may be arranged, to prevent the vacuum pump from accidently sucking liquid into the aerator when the vacuum pump may accidentally be in the vacuum mode instead of the in blowing mode. Preferably, in such a situation the vacuum pump may terminate operations as no air is being pumped in in vacuum mode. This also gives the user a feedback that the pump is, probably accidentally, in the wrong operation mode and should be switched to the blowing mode.

Advantageously, the aerator may further comprise an opening positioned between the cooperation element and the one-way valve, wherein the opening provides for a fluid connection between the tube and the environment outside of the aerator, preferably wherein the opening can be closed by a user to allow air blown into the aerator by a connected vacuum pump towards the one-way valve. The user can close the opening, e.g. by putting a finger onto the opening. When closing the opening, the air blown into the aerator by the pump will go through the channel from the inlet towards the one-way valve to the outlet. As such, the valve only opens when the pump is in the blowing operational mode, and thus, accidentally sucking in of liquid can be obviated. The user can keep the opening open, by keeping its finger free from the opening. With an open opening, the air blown in into the tube at the inlet will leave the tube at the open opening. This allows the user to control the aeration process relatively precise, as the user can also partially close or open the opening, and thus, the user can control the amount of air to be passed through the valve towards the outlet.

Preferably, the tube is hook-shaped having two legs, with the cooperation element provided at a first leg of the hook, and the free end provided at a second leg of the hook. By providing a hook-shaped aerator, the user can relatively easy handle the aerator, as the user can hold the aerator with one hand at the first leg. By providing such an opening that can be closed by a user, the user can control the aerating of the liquid by opening or closing the opening. As such, the user can in a relatively sensitive manner control the aerating of the liquid.

Advantageously, the opening is provided near a corner of the hook, preferably in the leg comprising the cooperation element. Then, the user can with a single hand hold or manipulate the aerator, and can open or close with a finger of that said hand the opening provided at the corner of the hook, preferably in the first leg.

Preferably, the tube of the aerator is sufficiently long to be able to extend into a bottle or a glass, e.g. between about 5 cm and about 25 cm, more preferably between about 10 cm and about 25 cm.

The filter can be provided as an element that is removable connectable to the tube. The tube itself may, additionally or alternatively, be assembled from a first component providing the first leg and a second component providing the second leg that may be removable connectable to each other. The inlet, configured for connection to a vacuum pump, can be an integral part of the tube, or of the first leg of the tube, but can alternatively be a separate element that is removable connectable to the tube or the first leg of the tube. By providing separate components that can be removable connected to each other, more easy assembly can be obtained. Also, this may allow for relatively easy de-assembly and/or cleaning of the individual components.

Further, according to an aspect of the invention, there is provided for a system comprising a suction pump, such as a vacuum pump, and an aerator, wherein the aerator can be removable connectable to the vacuum pump.

Also, there may be provided a system comprising a suction pump, such as a vacuum pump and a stand-alone re-usable valve for mounting to a food container. A system comprising such a stand-alone, re-usable valve and a food container may be provided. Additionally and/or alternatively, a system comprising a suction pump, a stand-alone re-usable valve and a food container can be provided.

Further, a system comprising a suction pump, such as a vacuum pump, and an adapter configured to engage with various types of valves of food containers, can be provided.

It is noted that is referred to a vacuum pump in this disclosure to generally describe a suction pump, preferably a pump that is arranged to suck air out of a, preferably closed, container, such that a negative pressure or under pressure can be obtained in the closed container. However, any type of pump for use in a kitchen that is able to suck air and/or to blow air, can be used in cooperation with the described aerator, valve or adapter.

Further advantageous embodiments are represented in the subclaims.

These and other aspects will be further elucidated with reference to the drawing comprising figures of exemplary embodiments. Corresponding elements are designated with corresponding reference signs. In the drawing shows:

It is to be noted that the figures are given by way of exemplary examples and are not limiting to the disclosure. The drawings may not be to scale.

Figure 1:
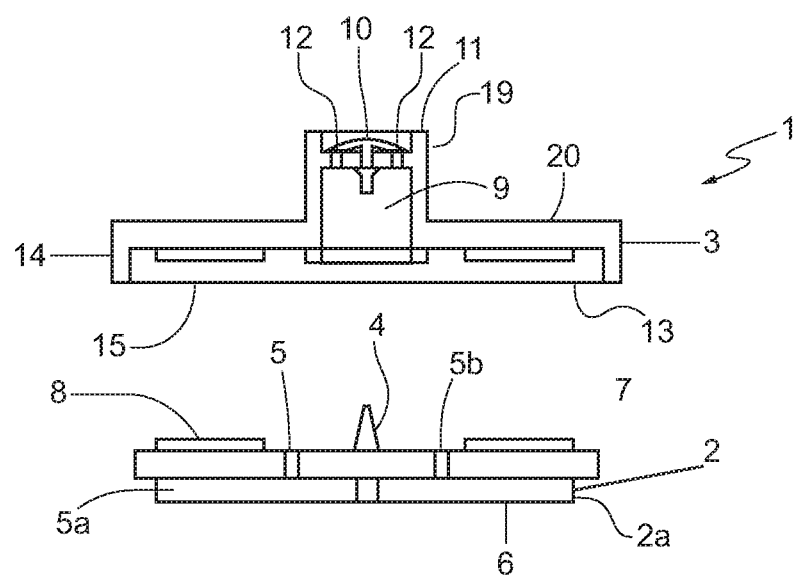
FIG. 1 shows an exploded view of a valve according to an aspect of the invention.

FIG. 1 shows a schematic exploded view of valve 1 having a base part 2 and a top part 3. The base part 2 comprises a puncturing element 4 for making a puncture in a wall of a food container, such as a wall of a bag or a lid of a food jar. The base part 2 further comprises at least one channel 5 passing through the base part 2. The channel 5 extends from a bottom side 6 of the base part 2 to a top side 7 of the base part 2 to provide a fluid connection from one side of the base part 2 to another side of the base part 2.

Here, a lower part 2a of the base part 2 can for example be established rib-shaped such that the channel 5 extends sideways between ribs 25 towards the upright part of the channel 5. A first channel part 5a thus extends sidewards between ribs 25 of the base part 2, and a second channel part 5b extends upwardly towards a top side 7 of the base part 2. A wall of the container may engage to a bottom of the base part 2, as to close the channel 5, as for example shown in FIG. 2, such that an entrance opening 5i of the channel 5 can be provided at a side of the first part 2. The ribs 25 may for example be configured in a star-shape, e.g. three or four or five ribs 25 may be provided in between the ribs 25 a channel 5 is obtained that can be closed by a wall of the container when the base part 2 is inserted in a container. The entrance opening 5i of the plurality of channels 5 is then at a side of the base part 2, such that, when the base part 2 is inserted in the container, a fluid connection between an inside of the container and the channel 5 can be established. An example of such a rib-pattern at the bottom side of the base part 2, is shown in the perspective view of FIG. 10a and FIG. 10b.

The channel 5 preferably ends near the puncturing element 4 such that, when a puncture is made in the food container, that a fluid connection can be established between the channel 5 and the puncture. Further, on the top side 7 of the base part 2, here a gasket 8 is provided for a sealing engagement with the wall of the food container. However, in other embodiments, such a gasket can be obviated.

The top part 3 is arranged for mounting onto the base part 2. The top part 3 is here provided with a channel 9 in which a valve element 10 is arranged. The valve element 10 is here a one-way valve element 10 that is adaptable between a closed position for closing off the top part channel 9 and an open position for allowing air to pass through the top part channel 9. Here, the valve element 10 is seated on a valve seat 11 in which perforations or openings 12 are provided. The valve element 10 closes the openings 12 in the closed position, but under influence of an operating vacuum pump, the valve element 10 moves upwardly away from the seat 11 to open the openings 12.

A bottom side 13 of the top part 3 is arranged for mounting onto the top side 7 of the base part 2. The bottom side 13 may be provided with a skirt 14 that is configured to fit around the top side 7 of the base part 2. The bottom side 13 of the top part 3 may optionally be provided with a corresponding gasket 15, but the gasket 15 may be obviated as well. In this embodiment, the top part 3 is provided with a skirt that fits around the base part 2, but in another embodiment, the base part 2 may be provided with a seat in which the top part 3 may fit. Such a seat may even be tapering outwardly, and the top part 3 may have a correspondingly tapered edge that fits in the tapered skirt, which makes mounting the top part 3 to the base part 2 more easy due to auto-centering of the top part 3 with respect to the base part 2 in view of the corresponding tapered edges.

The channel 9 is preferably arranged in the top side 3 such that, when in use mounted onto the base part 2, a fluid connection can be established with the puncture made by the puncturing element 4. So, preferably, the channel 9 is arranged such that when mounted to the base part 2 it surrounds the puncturing element 4 to provide a fluid connection. The channel 9 is arranged in sleeve-like element 19 protruding outwardly from a top side 20 of the top part 3. Inside of the sleeve 19 the channel 9 is formed.

The top part 3 further is configured to receive a vacuum pump or at least a coupling element of a vacuum pump. For example, the vacuum pump may fit over the sleeve 19 engaging the top side 20, or may fit inside of the sleeve 19 over the valve element 10 engaging the seat 11. The valve element 10 is arranged in the channel 9, such that, when the valve element 10 is open, a fluid connection is established through the channel 9 from one side of the top part 3 to an opposite side of the top part 3.

Figure 2:
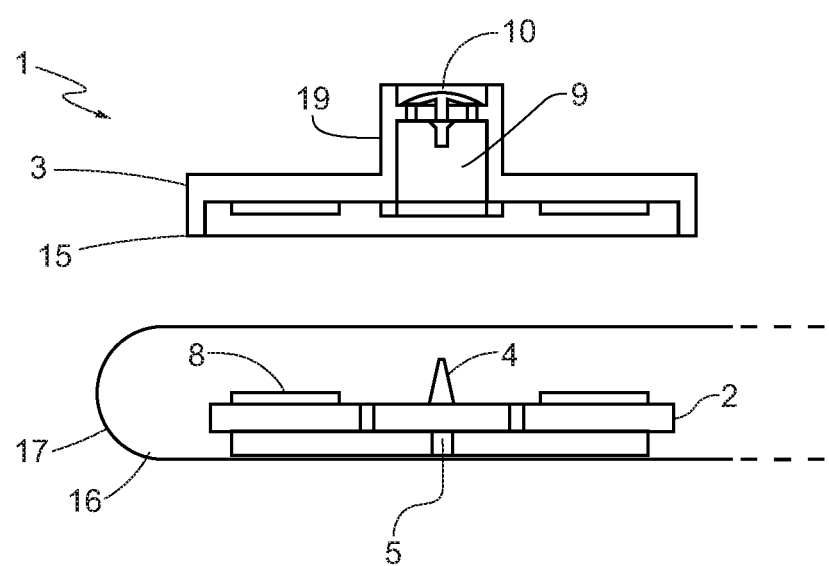
FIG. 2 shows an example of the mounting of the valve of FIG. 1 to a food container, in particular to a food bag.

FIG. 2 shows a method of mounting the valve 1 to a food container 16. The food container 16 is here partially represented, and is here a wall 17 of a flexible food bag 16. Such a food bag is often used for storing food, and can be tightly closed, for example by zip closing. By using the valve 1, the food in the bag 16 can now also be stored under vacuum or a negative pressure in the bag. Vacuum or negative pressure or under pressure is understood to be a pressure lower than the atmospheric pressure. This can for example be obtained by sucking air out of the food container.

The base part 2 is positioned inside of the food container 16, it can be positioned at any random position. The bag 16, in particular the wall 17 of the bag 16, is then around the base part 2, as can be seen in FIG. 2. The top part 3 is then mounted onto the base part 2 with the wall 17 in between the top part 3 and the base part 2. By mounting the top art 3 onto the base part 2, the puncturing element 4 punctures the wall 17 and a hole 18 is made in the bag 16. The gaskets 8, 15 provide for an air-tight closure around the puncturing element 4, and prevent leakage of air sideways of the valve 1, such that air can be sucked out of the bag 16 only via the fluid connection established via base part channel 5, hole 18 of the bag 16 and top part channel 9.

A wall of the sleeve 19 extends somewhat downwardly providing for a ring 19a that, in use abuts to the wall 17 of the bag 16 as to improve puncturing of the, flexible, wall of the bag by the puncturing element 4.

Figure 3:
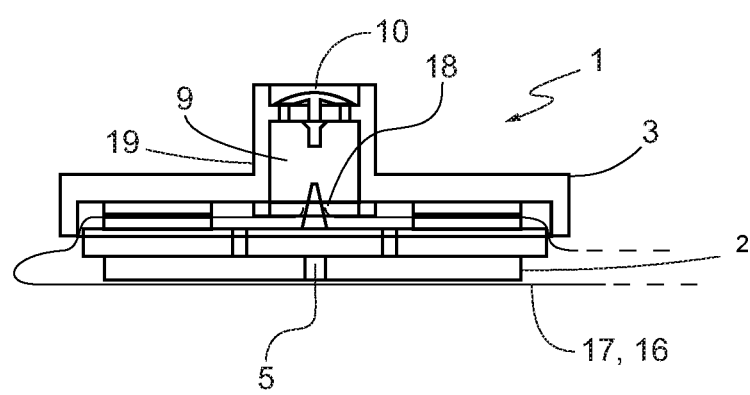
FIG. 3 shows the valve of FIG. 1 and FIG. 2 mounted to the food bag.

The mounted condition of the valve 1 is shown in FIG. 3 in which the top part 3 is mounted onto the base part 2 with the flexible wall 17 of the bag 16 in between. The skirt 14 is shaped as to guide the wall 17 of the bag 16 smoothly between the top part 3 and the bottom part 2 as to attempt avoidance of rupture of the bag 16. A deliberate puncture of the bag 16 is intended by the puncturing element 4, but otherwise the bag is to be kept intact. The valve 1 is thus a stand-alone valve that is independent of any food container and can be mounted to many types of food container, having a stiff or a flexible wall, as long as the puncturing element can make a hole in the wall. The valve 1 can also be removed again from the container, and then be re-used on another container.

Figure 4:
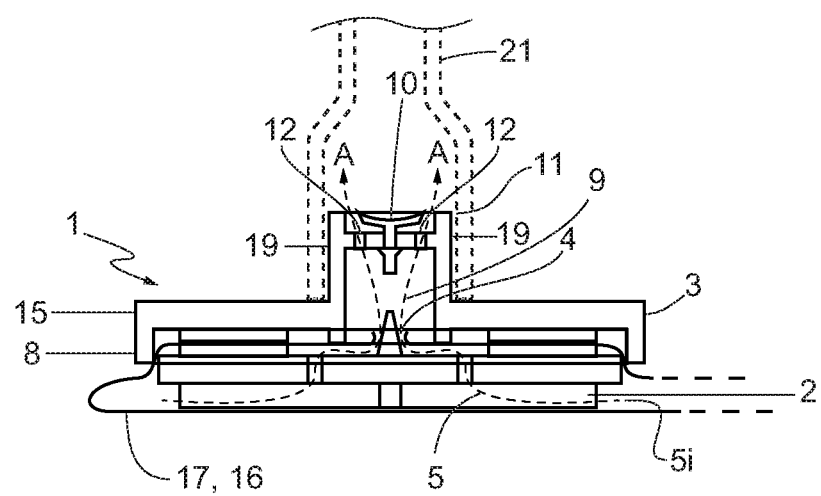
FIG. 4 shows a path of the air being removed out of the food bag via the valve of FIG. 3.

FIG. 4 shows the path the air follows when being sucked out of the container by a vacuum pump engaged to the top part 3 of the valve 1. Here, schematically, a coupling element 21 connected to a vacuum pump is shown. When the vacuum pump is operating, air is sucked out of the container 16. The path the air follows is illustrated with arrows A. The air is sucked out of the container 16 via the channel 5, through the first channel part 5a between ribs 25 of the base part 2, then through the second channel part 5b of the base part 2 towards the hole in the bag 16 made by the puncturing element 4. Then, the air further goes through the channel 9 of the top part 3, through the openings 12 that are now open because of the open position of the valve element 10 in which the valve element 10 is away from the valve seat 12. The air then goes out of the valve 1 towards the vacuum pump. The sealing engagement of the gaskets 8, 15 prevents air from leaking along the wall 17 of the bag 16 towards the environment outside of the bag 16. However, another sealing engagement can be obtained between the top part 3 and the base part 2 with the wall 17 of the food container 16 in between. For example, the flexible wall 17 of the bag 16 can be used for sealing the top part 3 to the base part 2 or a resilient protrusion on one of the top part or the base part may engage to a seat on the other one of the top part or the base part to form a sealing engagement with the wall of the container in between. Many more variants can be possible.

Due to the under pressure in the bag, the top part 3 and the base part 2 will be pulled more towards each other so a more air-tight connection can be obtained with an increasing under pressure. Such a firm connection remains intact as long as the under pressure is in the bag. When the under pressure is gone, the connection between the top part and the base part can become more loose as well. In some embodiments, a separate locking may then be considered. For example, a clip can be provided that fits over the top part 3 and the base part 2 with the bag inbetween. The clip may then firmly lock the top part and the base part, with the bag inbetween, together. Alternatively, the skirt of the top part 3 may be provided with a thread that engages a groove in the base part 2. Or, between the skirt of top part and a rib-groove connection can be provided for a mechanical locking of the top part to the base part, with, in use, the flexible wall of the bag inbetween. Additionally and/or alternatively, the top part and the base part may be provided with magnetic elements to establish a magnetic locking of both parts. In another embodiment, the puncturing element may be provided as a hollow tooth, in which the channel 5 is provided. An outside of the hollow tooth may be provided with a thread to which the top part can be screwed. Due to the screw connection an air-tight connection and a firm mechanical locking can be obtained.

Figure 5:
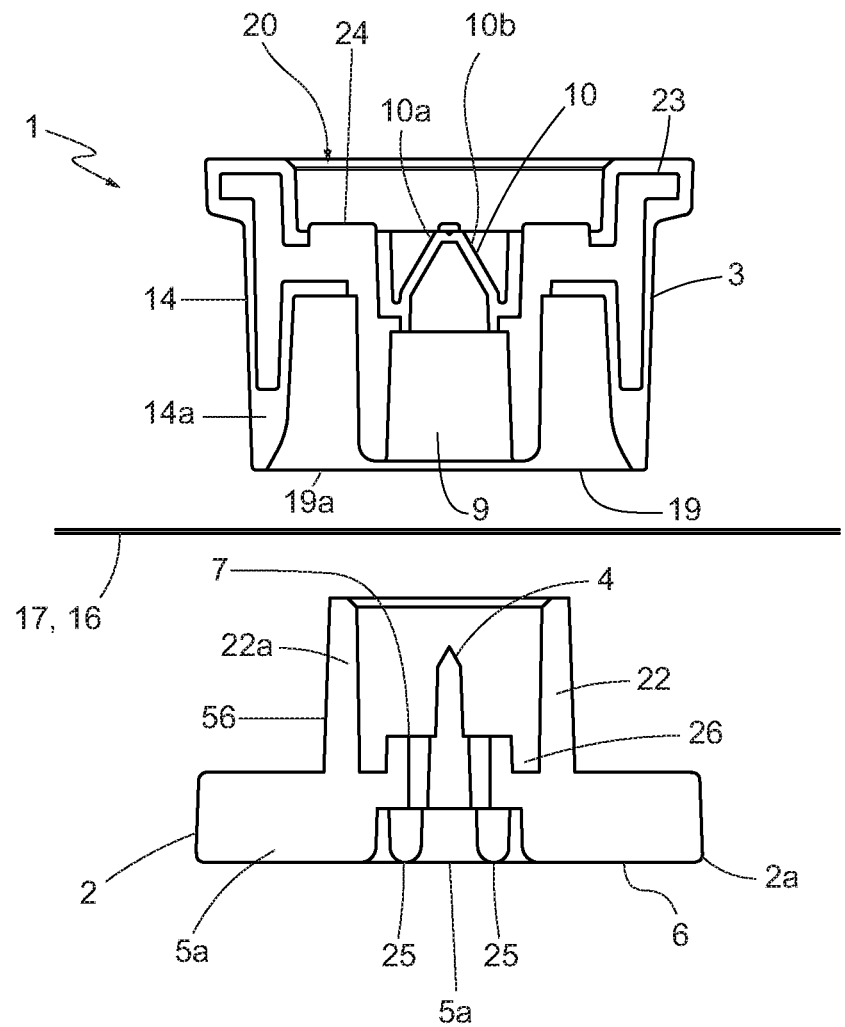
FIG. 5 shows an exploded view of a valve according to another aspect of the invention.
Figure 6:
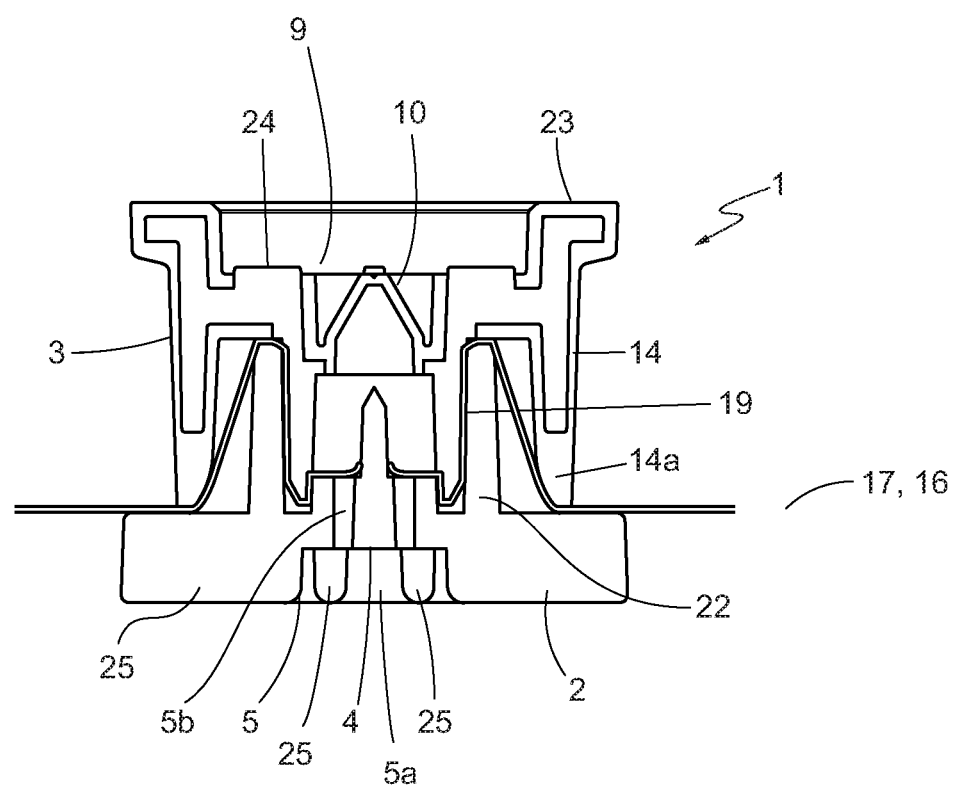
FIG. 6 shows the valve of FIG. 5 mounted to a food container, in particular a food bag.
Figure 7:
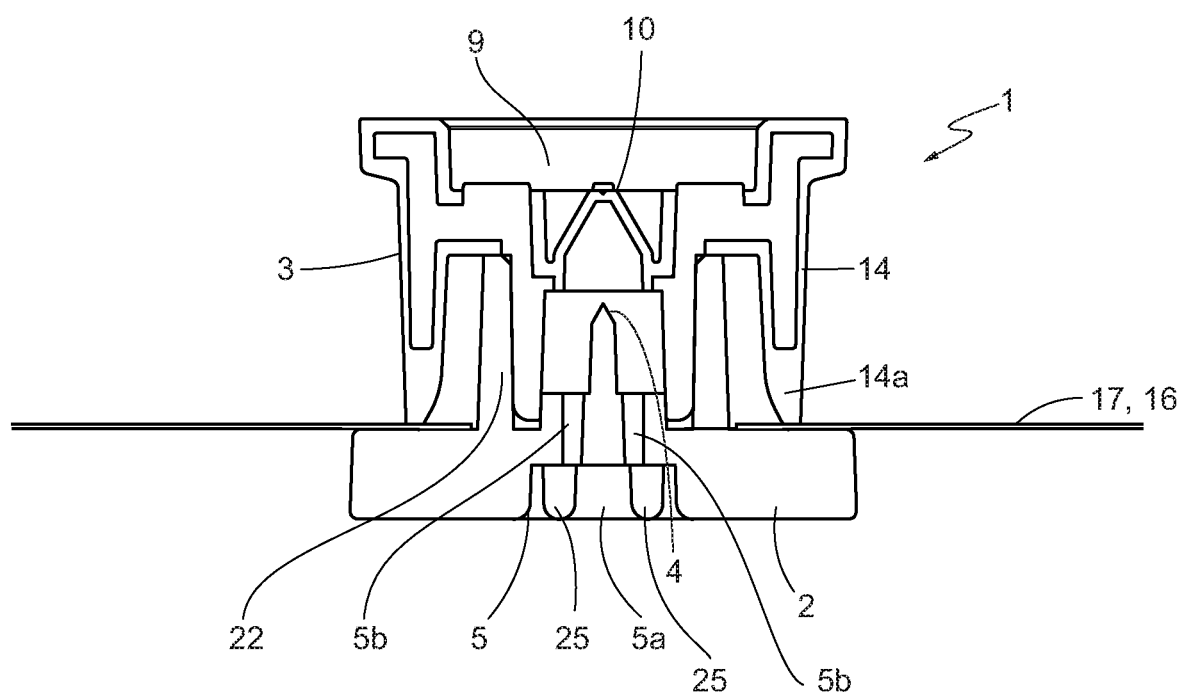
FIG. 7 shows the valve of FIG. 5 mounted to a food container, in particular a lid of a food jar.

FIGS. 5, 6 and 7 show another embodiment of a valve 1 according to the invention. In this embodiment no separate gaskets are provided, and the sealing is provided by either the flexible wall of the bag itself or by a resilient part of the valve 1.

Figure 10A:
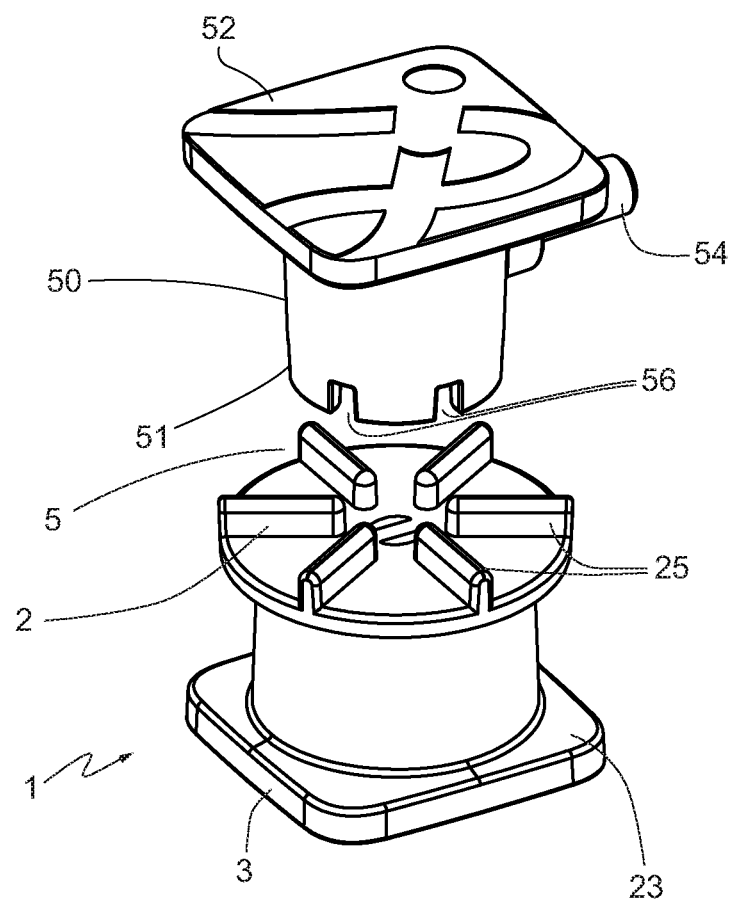
FIG. 10a and FIG. 10b show a perspective view of the valve with the intermediate element as a key.
Figure 10B:
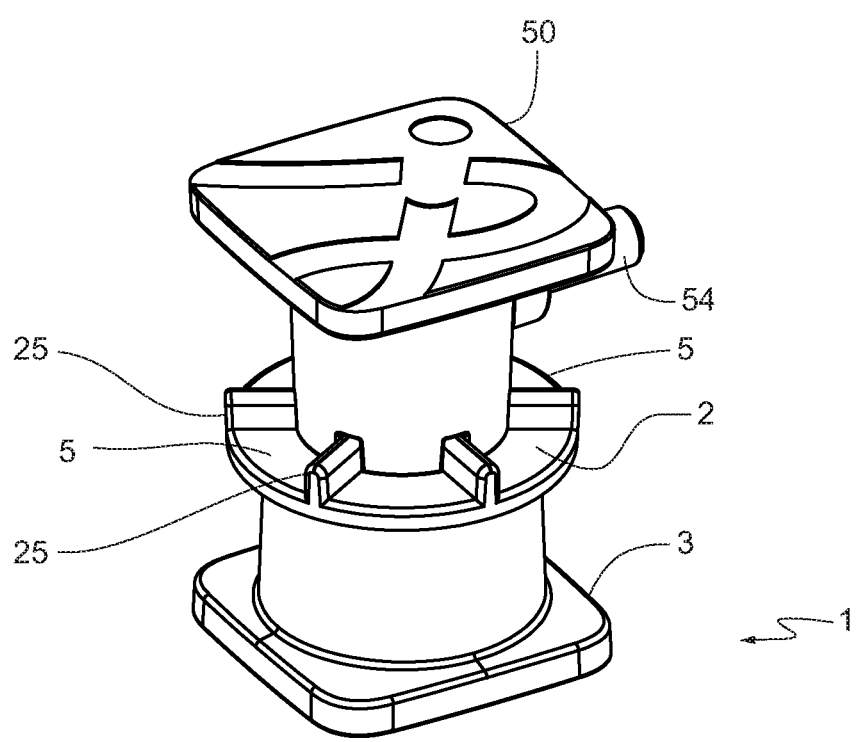

The base part 2 is provided with a puncturing element 4. Through the base part 2, from one side 6 to another side 7, the channel 5 is provided. In a lower part 2a of the base part 2, the channel part 5a is established between radially extending ribs 25. The plurality of radially extending ribs 25 may be arranged in a star-like shape, with channels 5 arranged in between. FIGS. 10a, 10b show such an arrangement of the ribs 25 at a bottom of the base part 2 with the channels 5 inbetween the ribs 25. Even when a wall 16, 17 of the container may close the channel parts 5a allowing a channel entry 5i to be formed at a side of the bottom part 2, when the base part 2 is received in the container, a fluid connection can be established between an inside of the container and the channel 5 via the channel entries 5i. The channel 5a ends approximately centrally of the base part 2 and then continues in an upwardly extending channel part 5b. The channel 5 ends near the puncturing element 4. Around the puncturing element 4, an upwardly extending sleeve 22 is provided. The sleeve 22 may protect the puncturing element 4, e.g. from breaking, but may also provide for mechanical connection with the top part 3.

The top part 3 comprises here too a sleeve 19 an inner side of which forms the channel 9. The valve element 10 is here arranged as a duck bill valve, wherein in an open position of the duck bill valve beak elements 10a and 10b move away from each other to establish an opening through which air can pass. The valve element 10 is arranged in the channel 9, such that, when the valve element 10 is open, a fluid connection is established from one side of the channel 9, typically a bottom side, to an opposite side of the channel 9, typically a top side 20, through the top part 3. A top side 20 of the top part 3 is configured to receive a vacuum pump, in particular a coupling element of a vacuum pump. For example, the coupling element can engage inside of the sleeve 19 around the valve element 10. Alternatively, a coupling element of a vacuum pump may engage with a collar 23 of the top part 3. In another alternative, a coupling element may engage with a ring shaped surface 24 of the top part 3, or on any other position of the top side 20 of the top part 3.

The sleeve 19 is arranged to fit inside of the sleeve 22, and advantageously has a corresponding shape to allow easy insertion of the sleeve 19 into the sleeve 22. Of course, it is also possible to arrange the sleeve 19 such that it fits over the sleeve 22. Here, the sleeve 19 may even fit in a receiving groove 24 arranged around the channel 5 and the puncturing element 4.

The top part 3 is further provided with a skirt 14 extending downwardly at an outer edge of the top part 3. A lower end 14a of the skirt 14 can be provided from an elastic, flexible or resilient material. As such, with the flexible wall 17 of the bag 16 between the top part 3 and the bottom part 2, the resilient end 14a may allow smooth guidance of the wall 17 towards the sleeve 22, as can be seen in FIG. 6. When there is a rigid wall 17 of a container 16, such as the lid of a jar, or a wall of a can, between the top part 3 and the bottom part 2, the resilient lower part 14a of the skirt 14 can provide for an air-tight connection between the top part 3 and the bottom part 2.

The sleeve 19 and the sleeve 22 are preferably correspondingly shaped as to engage tightly to each other such that a mechanical connection can be obtained. For example, an inner wall 22a and an outer wall 19a of the sleeve 22 and the sleeve 19 respectively can be tapered to provide for more auto-centering of the top part 3 with respect to the base part 2. Also, the sleeve 19, for example a part of the sleeve 19, may be dimensioned somewhat larger than the inner dimensions of the sleeve 22 as to provide for a clamping engagement. As such, firm mechanical connection can be obtained. For removing the top part 3 from the base part 2 then a key can be used that engages to the ribs 25 at a bottom of the base part 2. By a rotating movement of such a key, the base part 2 can be loosened from the top part 3.

Mounting of the valve 1 to a food container 16 is done in a similar way as for the valve 1 shown in FIGS. 1-4. The base part 2 is inserted into the container 16. Then, when the wall 17 of the container 16 is a flexible wall, the top part 3 is mounted onto the base part 2 with the wall 17 in between. Upon downward movement of the top part 3 towards the base part 2, the puncturing element 4 will make a hole 18 in the flexible wall 17 of the container 16. As such, a fluid connection is established between an interior of the container 16 and the top part 3. The fluid connection goes via the radial channel parts 5a, the axial channel part 5b, the hole 18 in the wall of the container, the channel 9 of the top part 3 to the valve element 10. When there is no suction pressure on the valve element 10, the valve element 10 is closed and no fluid connection with the environment outside of the valve 1 is established. When there is a vacuum pump engaged to the top part 3 and in operation, sucking air out of the container, the valve element 10 is open and a fluid connection is established between the interior of the container and the vacuum pump outside of the container and the valve. FIG. 6 shows the valve 1 in mounted condition with a flexible wall 17 of a container, typically a bag 16, in between.

FIG. 7 shows the valve 1 in mounted condition with a rigid wall 17 of a container, such as a can or a jar, in between. Here, the channel parts 5a remain open to the inside of the container 16, such that a fluid connection can be easily established between the inside of the container 16 and the channel 5 ending around the puncturing element 4. With a rigid wall of the container, such as a lid, the upwardly extending sleeve 22 of the base part 2 can be arranged to make a hole in the wall 17 prior to mounting the top part 3 onto the base part 2. For example, the sleeve may be provided with a relatively sharp edge allowing cutting of such rigid material, thereby the sleeve is embodied as the puncturing element. Alternatively, a separate tool may be provided for making a hole in the wall approximately the same size as the sleeve 22, such that the sleeve 22 can fit in the hole in the wall. When making a hole in the wall prior to mounting the top part 3, the circular patch that is stabbed out of the wall by the base part can then be removed, such that it doesn't block the air path when the valve 1 is assembled. The resilient part 14a of the skirt 14 then provides for an air-tight connection between the top part, the base part and the wall of the container. Manufacturing of the top part, comprising a rigid part and a resilient part, can for example be done by two-component injection moulding.

By providing such a stand-alone valve 1 that can be mounted to a commonly available food storage container, such as a food storage bag or food storage jar, a cost-effective solution is obtained for vacuum storage of food. Also, food bag with such a valve that has been vacuumised can be used for sous-vide cooking as well. The valve 1 can be placed at any position in or to the food container the user deems suitable and/or convenient. Even, when using a vacuum pump that can operate in a dual or a triple mode, i.e. also having an alternating mode in which the pump alternatingly sucks and blows air, such a vacuumised bag or box provided with the valve can be used for marinating food. A two-way valve element, instead of a single-way valve element may then be provided.

The valve is here shown as having a valve element integrated to top part. Alternatively, the valve element can be integrated to the base part. The puncturing element can be either provided at the top part or at the base part. As another alternative, a separate valve element can be provided, as shown e.g. in FIG. 17 and FIG. 18. Further, the puncturing element can be provided on either the top part or the bottom part, wherein the valve element can be provided on the top part or the bottom part or vice versa. Many configurations are possible.

Figure 17:
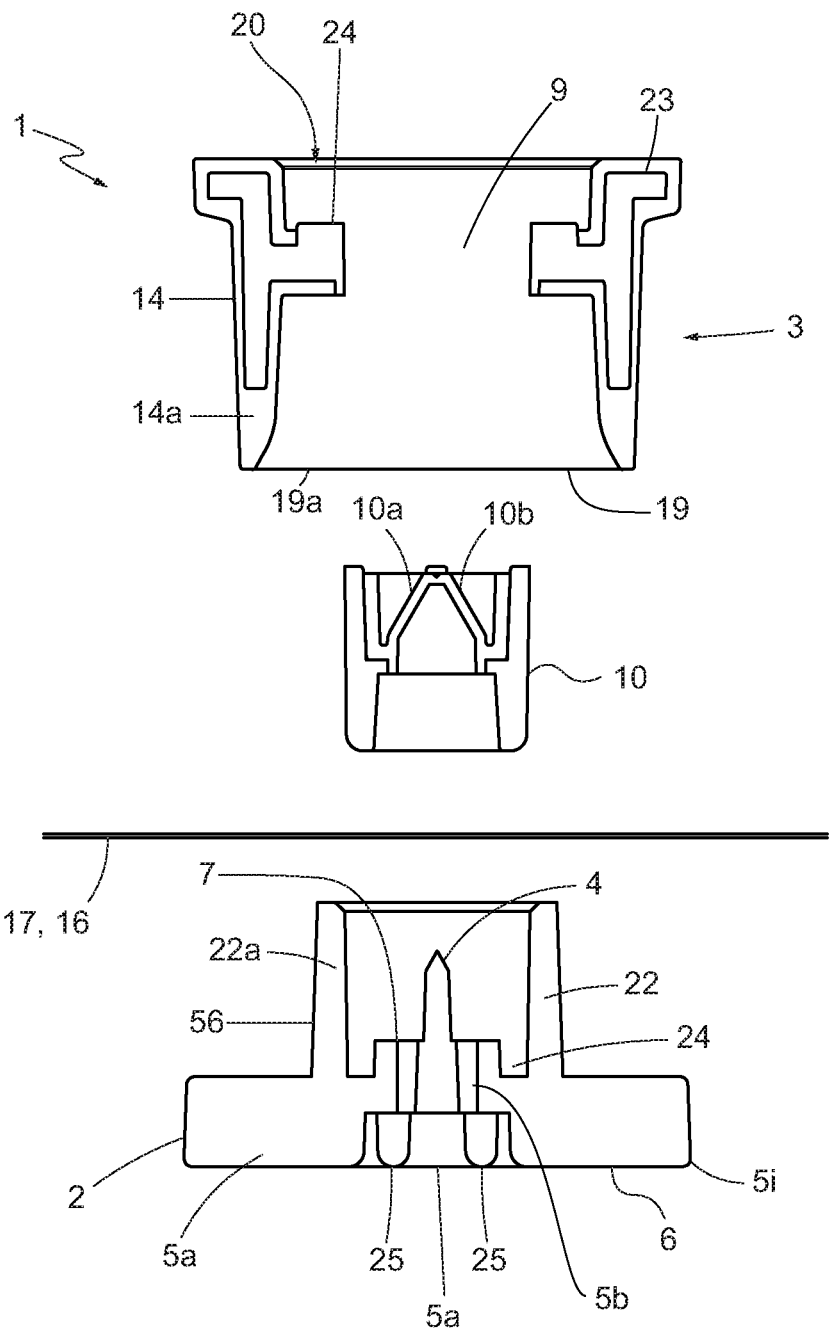
FIG. 17 shows an alternative embodiment of the valve.
Figure 18:
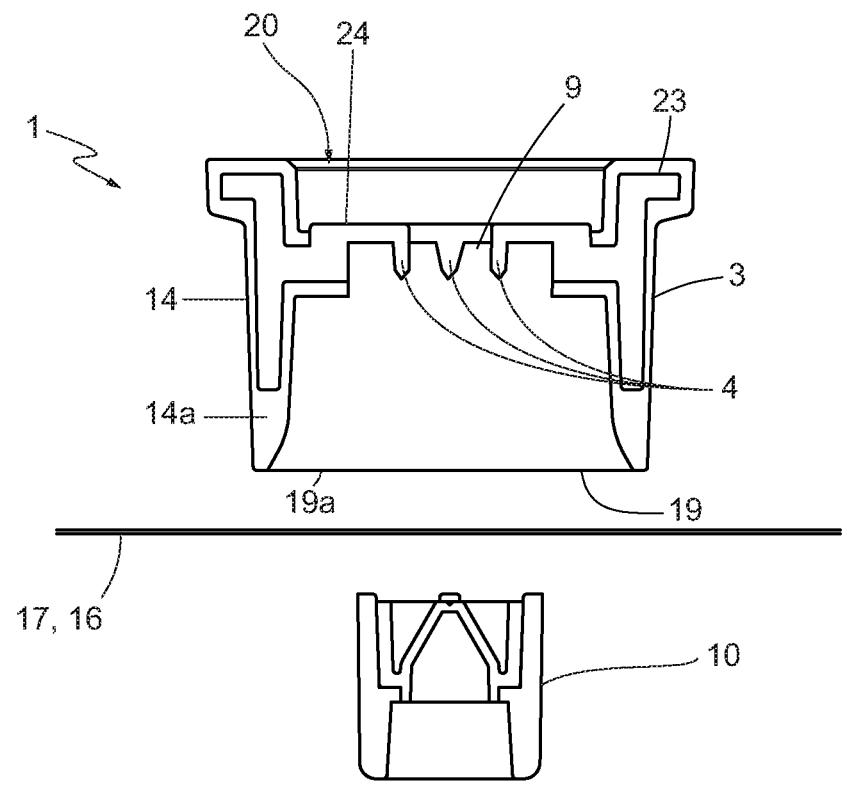
FIG. 18 shows an alternative embodiment of the valve.
Figure 18:
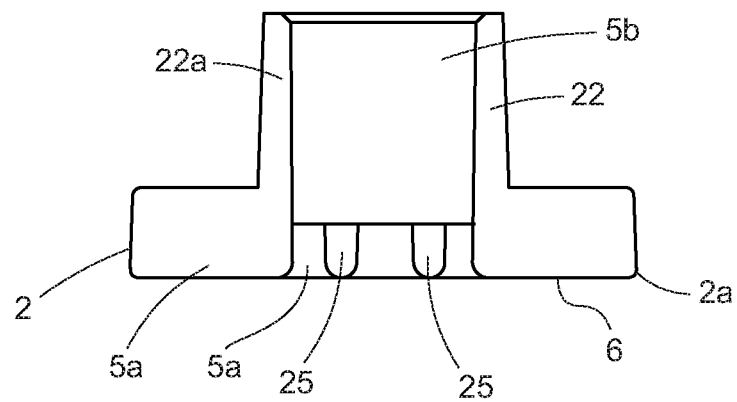

Turning now to FIG. 17 and FIG. 18, another embodiment of the valve 1 is shown. In this embodiment the valve element 10 is provided separately from the top part 3 and from the bottom part 2. FIG. 17 discloses the bottom part 2 having a puncturing element 4 at one side of the flexible wall 17 of the bag 16. The top part 3 and a separate valve element 10 are shown at the other side of the flexible wall 17 of the bag 16. The top part 3 is arranged to receive the separate valve element 10, while the bottom part 2 is also arranged to receive the valve element 10 therein. Similarly as in the embodiments of FIGS. 5-7, a receiving groove 26 is provided in which a sleeve 19 of the valve element 10 may fit. A channel 9 is provided in the top part 3, in which the valve element 10 can be received, when the top part 3 is mounted onto the bottom part 2. The top part 3 with the separate valve element 10 received therein is functionally the same as the second part disclosed in FIG. 5.

By providing a separate valve element 10, a user may for example replace the valve element 10 without having to replace the entire top part 3. This may be useful when the valve element 10 is damaged, or when an application of the valve 1 requires a valve element with different specifications. A range of valve elements having different nominal flow rates might for example be provided, wherein the user may select a valve element based on a required nominal flow rate. Further, by providing a separate valve element 10, a more modular system can be provided in which the valve element can be used together with the first and second part for forming the valve, or the valve element 10 can be used separately in a neck of a container, together or not with an adapter as shown in FIGS. 13a-13c or FIG. 14. Many possible uses of the valve element 10 become possible. Also, the manufacturing of the first part and the second part may become more simple, when the valve element is manufactured as a separate product.

In FIG. 17, the top part 3 is provided with a channel 9 extending through the top part 3. The valve element 10 can be received in a receiving space formed by the sleeve 22 around the puncturing element 4 of the bottom part 2. The top part 3 can then be mounted over the bottom part 2 with the valve element 10 received therein. The bottom part 2 is here arranged to be received in the interior of the container. In this embodiment, a part 5a of the first part channel 5 is provided with radially extending ribs 25 with recesses forming the channel 5 inbetween. The wall 17 of the container 16 is inbetween the bottom part 2 at one side and the valve element 10 and the top part 3 at another side of the wall 17. As such, the valve element 10, in open condition, establishes a fluid connection between an inside of the container 16, via the channels 5, the valve element 10 and the channel 9 with the environment outside of the container, such as a vacuum pump.

FIG. 18 discloses the bottom part 2 and a separate valve element 10 at one side of the flexible wall 17 of the bag 16 and the top part 3 at the other side, here the outer side of the wall 17. The bottom part 2 is arranged to receive the separate valve element 10 in a receiving space formed by the upper channel part 5b. The top part 3 is here provided with the puncturing element 4. In the embodiment of FIG. 18, the base part 2 is provided with a channel part 5a of the channel 5 at a bottom side, wherein the channel part 5a is formed by recesses or spaces in between radially extending ribs 25, such that, even when a wall of the container would close the channel 5 at the bottom side of the base part 2, a fluid connection can be established between the interior of the container and the channel 5 via entrance openings in a side of the base part 2. The embodiments of the valve 1 shown in FIG. 17 and FIG. 18 show that the puncturing element 4 can be comprised by either the base part 2 or the top part 3 as long as the puncturing element 4 is arranged for making a puncture in the wall 17 of the bag 16 or container 16. In any event is the puncturing element 4 configured for making a puncture in the wall of the container. In another embodiment, the puncturing element is not provided on the valve 1, but the puncture in the wall of the container can be made by the user with a separate tool. The user then may position the base part and top part of the valve at the position of the puncture. Furthermore, the valve element 10 can be comprised by the base part 2, by the top part 3, or the valve element 10 can be provided as a separate component, as long as the valve element 10 is arranged between the base part 2 and the top part 3, such that the valve element 10 provides for a fluid connection between the channel 5 of the base part 2 and the channel 9 of the top part 3, such that, in use a fluid connection can be established between an interior of the container and an outside of the container. In another embodiment of the valve 1, not shown in the figures, and the puncturing element 4 and the valve element 10 may be provided both on the same part, base part or top part. The valve element as a separate element, or as an integrated element, can be arranged, in use, inside the container or can be mounted from the outside of the container. Many variants will be apparent to the person skilled in the art.

In the embodiment of FIG. 18, the valve element 10 is receivable in the channel part 5b of the base part 2. The top part 3 is provided with a channel 9 through the top part 3. The base part 2 with the valve element 10 is inserted in an inside of the container 16. Then, the top part 3 is mounted over the base part 2 with the valve element 10 and the wall 17 of the container 16 is inbetween the top part 3 and the base part 2 with valve element 10. Upon mounting the top part 3 onto the base part 2 with valve element 10, the puncturing elements 4 of the top part 3 will puncture the wall 17 of the container 16, such that a fluid connection can be established between the inside of the container 16, via the channels 5, the valve element 10, when in open condition, and the channel 9 of the top part 3, and the outside of the container.

Figure 8:
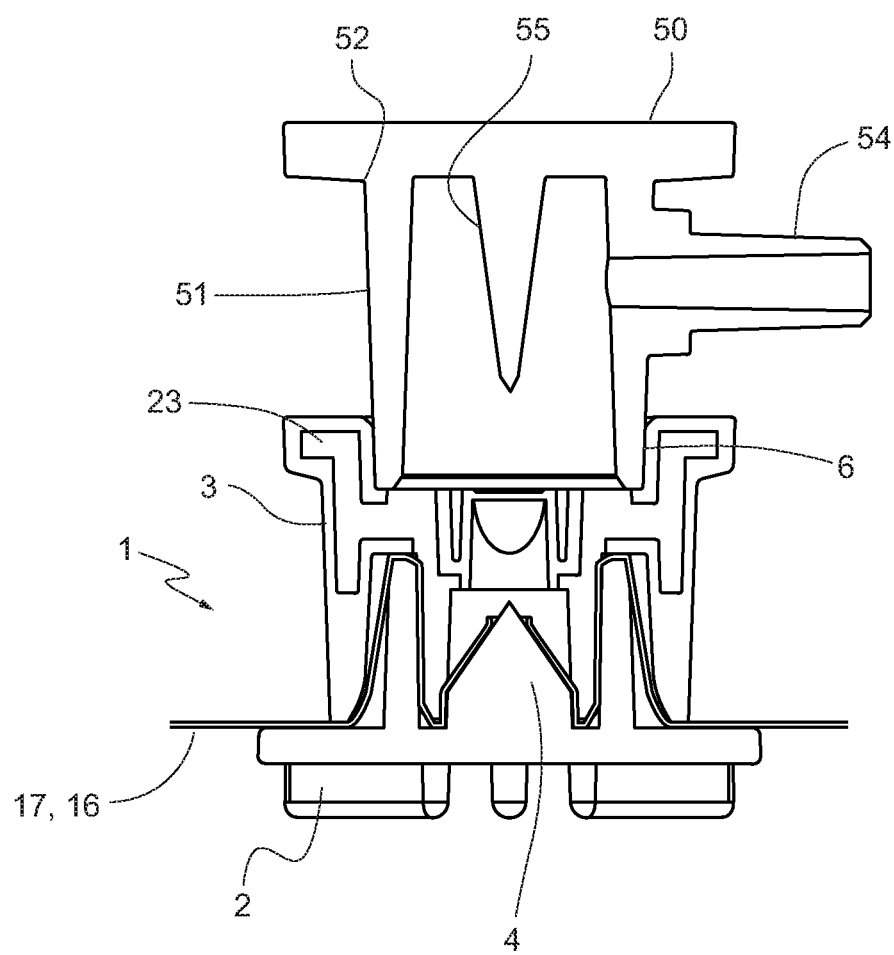
FIG. 8 shows an embodiment of a valve with an intermediate element.

Turning now back to FIG. 8. FIG. 8 shows an embodiment of an intermediate element 50 that is configured to engage at one end with the valve 1, and at another end with the vacuum pump. The intermediate element 50 comprises a tubular shaped wall 51 that at an upper end is closed by a top plate 52. The wall 51 forms an interior space 53. To the interior space 53 an outlet 54 is fluidly connected. The outlet 54 is in this embodiment configured as an outwardly protruding tube shaped element, that extends sideways from the wall 51. Alternatively, the outlet 54 can extend upwardly, or inclined, from the top plate 52. In the interior space 53 further a pin 55 is provided. As can be seen in FIG. 8, the wall 51 is somewhat tapered from a lower end towards the top plate 52. An outer side of the wall 51 is shaped correspondingly to fit into a receiving seat provided by the collar 23 at the top side 20 of the top part 3 of the valve 1. The collar 23 is at least partially covered with resilient material, or with a resilient coating, such that, when the intermediate element 50 is mounted onto the top part 3 of the valve 1, the intermediate element 50 engages with the resilient material and a firm connection can be established with the valve when the vacuum pump in operation creates an under pressure. To the outlet 54 a coupling element of the vacuum pump can be connected. Alternatively, between the outlet 54 and the vacuum pump, an external overflow reservoir can be connected, in which liquid that accidently comes with the air sucked out of the container, can be received. The accidently sucked up liquid can then drop down in the overflow reservoir, while the air can continue to flow towards the vacuum pump. As such, it can be prevented that liquid may reach the vacuum pump. A user then also can easily empty the overflow reservoir.

Figure 9:
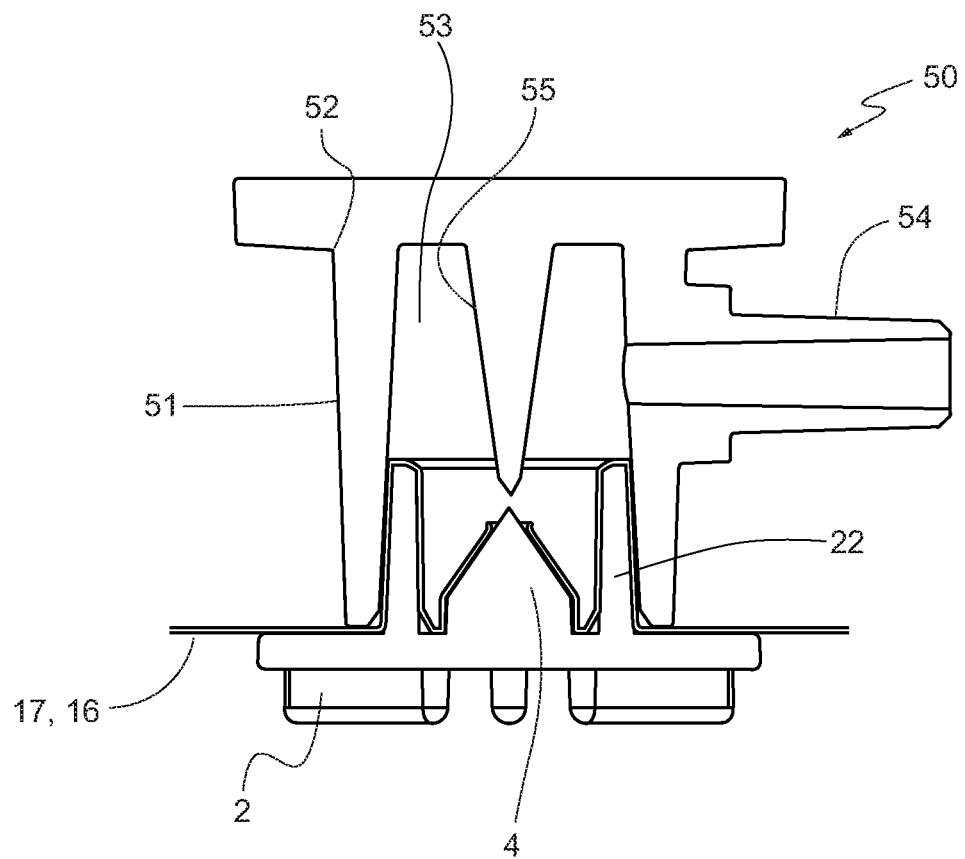
FIG. 9 shows an embodiment of an intermediate element mounted on the base part of the valve.

FIG. 9 shows an alternative use of the intermediate element 50. Here, the intermediate element 50 is mounted directly on the base part 2 of the valve 1, the base part 2 being inserted in the food bag 16 to be vacuumised. The inner side of the wall 51 is shaped correspondingly with the shape of the sleeve 22 as to provide a tight-fit, advantageously a clamping fit, with the sleeve 22 of the base part 2. The wall 17 of a food bag 16 is between the intermediate element 50 and the base part 2, such that the wall 17 of the bag 16 acts as a sealing for providing an air-tight engagement between the intermediate element 50 and the base part 2. In this configuration, the base part 2 with the intermediate element 50 can be used together with a dual-use vacuum pump that can operate in alternating mode. Such a dual-use vacuum pump may alternatingly suck and blow air out and in of the container. Such an alternating operation mode of the vacuum pump is advantageous for marinating food, it may speed up and/or may intensify the marinating process. Here too, the outlet 54 can be directly coupled to the coupling element of the vacuum pump or can be coupled to an external overflow reservoir in which liquid can be received that comes together with the air out of the container 16. The pin 55 extends from the top plate 52 into the interior 53 of the intermediate element 50 and extends sufficiently far into the interior that, when engaged to the base plate 2, it extends further than the upper end of the sleeve 22. As such, the pin 55 can make a hole in the wall 17 of a bag 16, which wall extends between the upper side of the sleeve 22 when the base part 2 is inserted in the bag, and the wall 17 cannot be reached by the puncturing element 4.

FIGS. 10a and 10b show an alternative use of the intermediate element 50. The wall 51 of the intermediate element 50 is at its free end provided with cut-outs 56 that correspond to the ribs 25 of the base part 2. As such, the intermediate element 50 can be used as a key that can be form locked to the bottom 6 of the base part 2, in particular to the ribs 25. By rotating the intermediate element 50, the base part 2 can be loosened from the top part 3. The top part 3, in particular the collar 23 is rectangular shaped, as to easily held, e.g. in one's hand, while rotating the intermediate element 50. FIG. 10b shows the intermediate element 50 mounted over the ribs 25 to form lock with the base part 2.

Mounting the stand-alone, re-usable valve to the container provides for a more reliable and secure valve connection as compared to containers with integrated valves or to bags that have to be sealed by a vacuum sealer. Due to the re-usability of the valve, it gives a more cost effective solution to the user for vacuumising food containers. The user can simply buy commonly available food bags or food boxes, and then can vacuumise them by mounting such a re-usable valve to the container. The user can also simply remove the valve from the container after use, and re-use it by mounting it to a different food container.

FIGS. 11, 12, 13a, 13b, 13c and 14 show an embodiment of a valve adapter 100 that is arranged to couple with a specific type of vacuum pump coupling element at one side and that can fit over various types of valves at another side.

Figure 11:
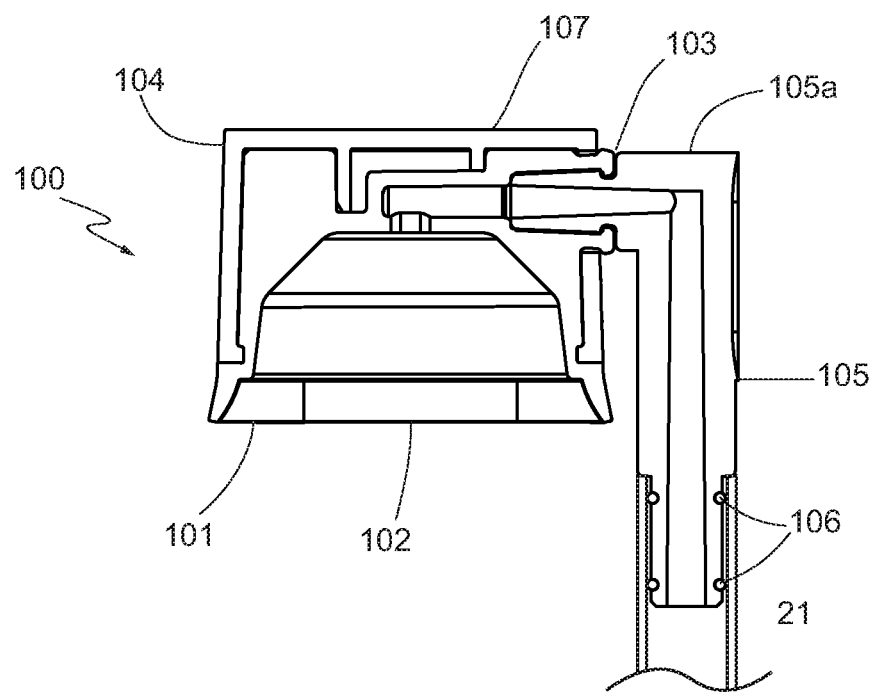
FIG. 11 shows a cross-section of an adapter according to another aspect of the invention.
Figure 12:
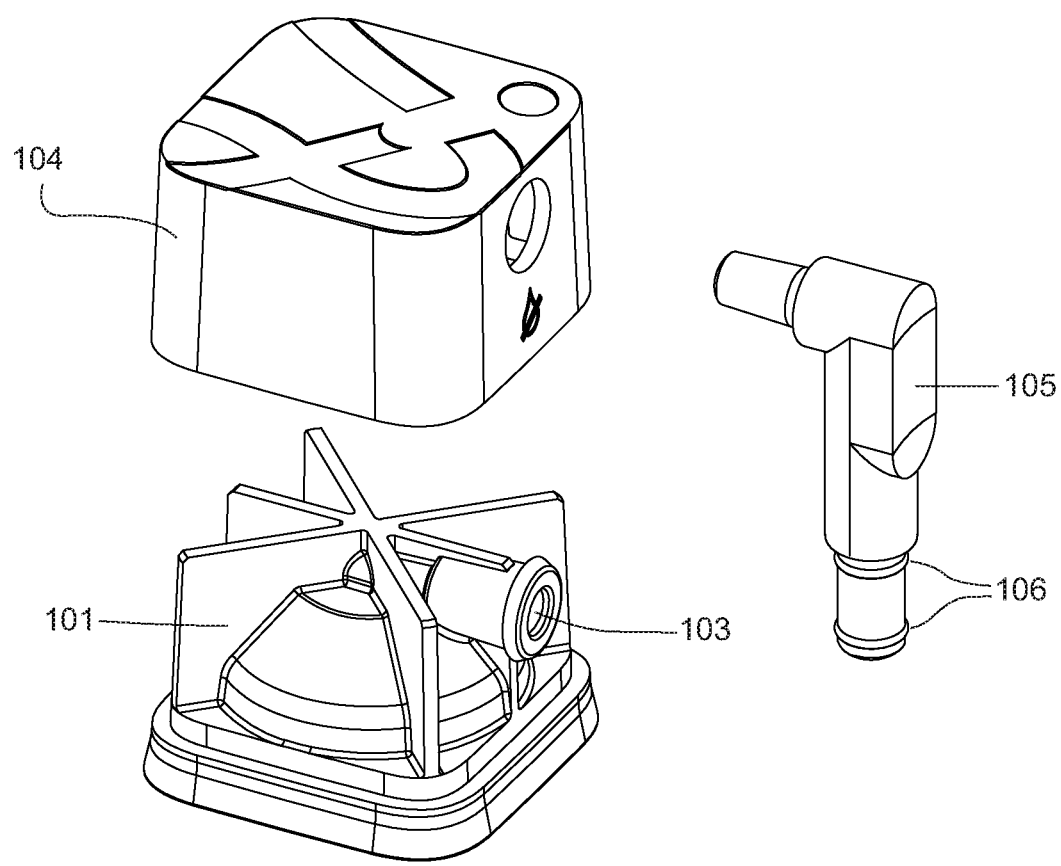
FIG. 12 shows an exploded view of the adapter of FIG. 11.

The embodiment of FIGS. 11 and 12 comprises a cap 101 that at an underside thereof is provided with a recess 102 that fits over various types of valves. At an opposite side, typically an upper side, the cap 101 is provided with an opening 103 that is connectable to the coupling element of the vacuum pump. The cap 101 can be fully or partially flexible or resilient or elastic. Flexible or resilient or elastic or deformable are used interchangeable in the meaning that the material can deform somewhat when engaging it to a valve or to an apparatus comprising such a valve and/or when subject to an under pressure, but that moves back to its original configuration once the engagement and/or the under pressure is gone. Over the flexible cap 101 a rigid shell 104 is provided that allows relatively easy handling of the adapter 100.

In the opening 103, a coupling element 21 of a vacuum pump may be directly connected to the opening, as for example in the embodiment of FIG. 10. Alternatively, the coupling element of the vacuum pump can be indirectly connected to the opening 103, as for example shown in the embodiment of FIGS. 11 and 12, via an arm 105. The arm 105 can be at one end 105a inserted into the opening 103 and can be mechanically locked to the opening 103, e.g. via rims engaging in a groove of the end 105a. At the other end 105b of the arm 105, the coupling element 21 of the vacuum pump can be coupled to the arm. Resilient rings or ribs 106 may be provided to retain the coupling element to the arm during use. Here, the opening 103 is provided in a radial direction such that the output channel 107 of the cap 101 exits radially. The output channel 107 is in fluid connection with the inner recess 102 of the cap. In an alternative embodiment, the output channel 107 of the cap 101 extends in axially direction and the opening 103 is at a top side of the cap 101. In the arm 105 a fluid channel 108 is provided that, when the arm 105 is coupled to the opening 103, is in fluid connection with the channel 107 of the cap and with the recess 102 of the cap. As such, when the cap 101 is then mounted over a valve, and the vacuum pump is connected to the adapter 100, a fluid connection is established from the valve to the recess 102, the output channel 107, to the coupling element of the vacuum pump, via the arm 105 or not.

In the embodiment of FIGS. 11 and 12, the cap 101 is at least at an inner side thereof facing the recess 102 of resilient material, such that many types of valves can be accommodated when the adapter 100 is mounted over the said valve. Alternatively, the entire cap 101 can be embodied as a resilient cap 101 while maintained in the rigid shell 104. As such, various types of valves can be accommodated.

Figure 13A:
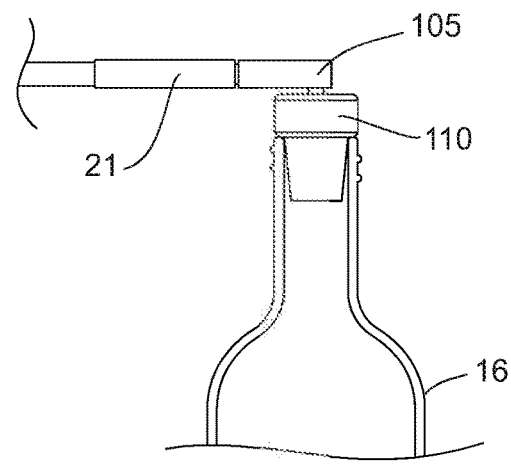
FIG. 13a shows an embodiment of the arm directly connected to a type of valve.
Figure 13B:
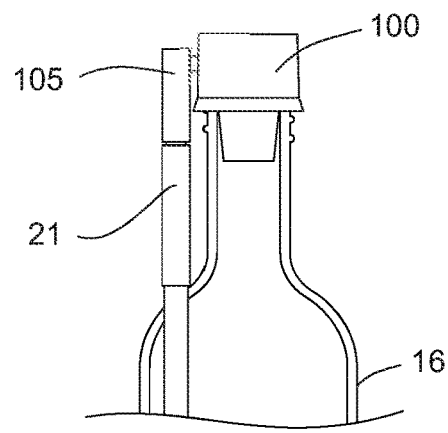
FIG. 13b and FIG. 13c show various positions of an arm coupled to an adapter.
Figure 13C:
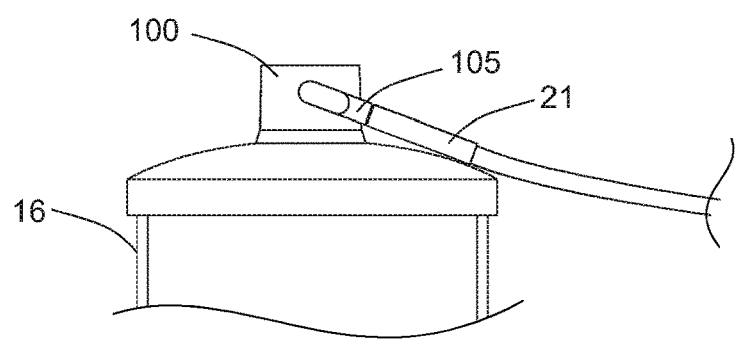

FIG. 13a shows the arm 105 directly connected to a type of valve 110 that is provided with a receiving opening at a top side thereof in which the arm 105 fits. The arm 105 can then be connected with the coupling element 21 of the vacuum pump. The hose of the vacuum pump to which the coupling element 21 is provided may bend downwardly towards a vacuum pump. In the example of FIG. 13b, the arm 105 is connected to an adapter 100, wherein the adapter 101 has the opening 103 for connection with the arm at a side thereof. The arm 105 then may move to a downward position under influence of gravity, which may aid in pulling the adapter 100 further downward over the valve to which it is mounted. In an alternative example, shown in FIG. 13c, the arm 105 moves downwardly towards an inclined position with the hose connected to the arm via the coupling element 21 bending downwardly as well.

Figure 14:
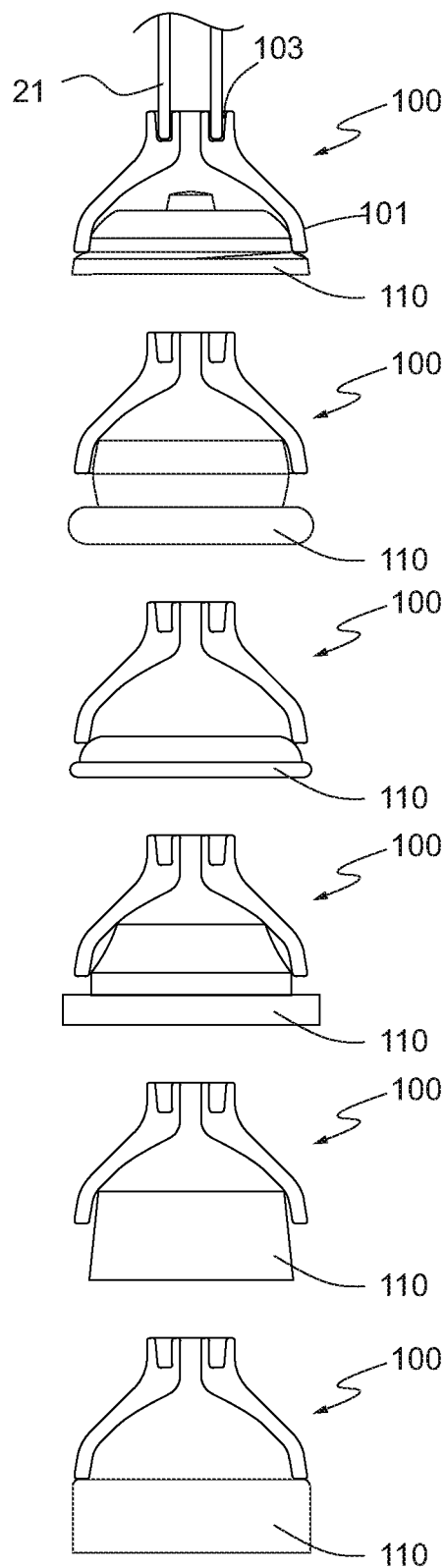
FIG. 14 shows examples of the adapter engaged to various types of valves.

In the embodiment of FIG. 14, advantageously an inner side and/or a lower end is provided from resilient material to flexibly engage with various types of valves 110, as shown in FIG. 14. The cap 101 can be entirely flexible, or can be provided with a more rigid outer side.

Figure 15:
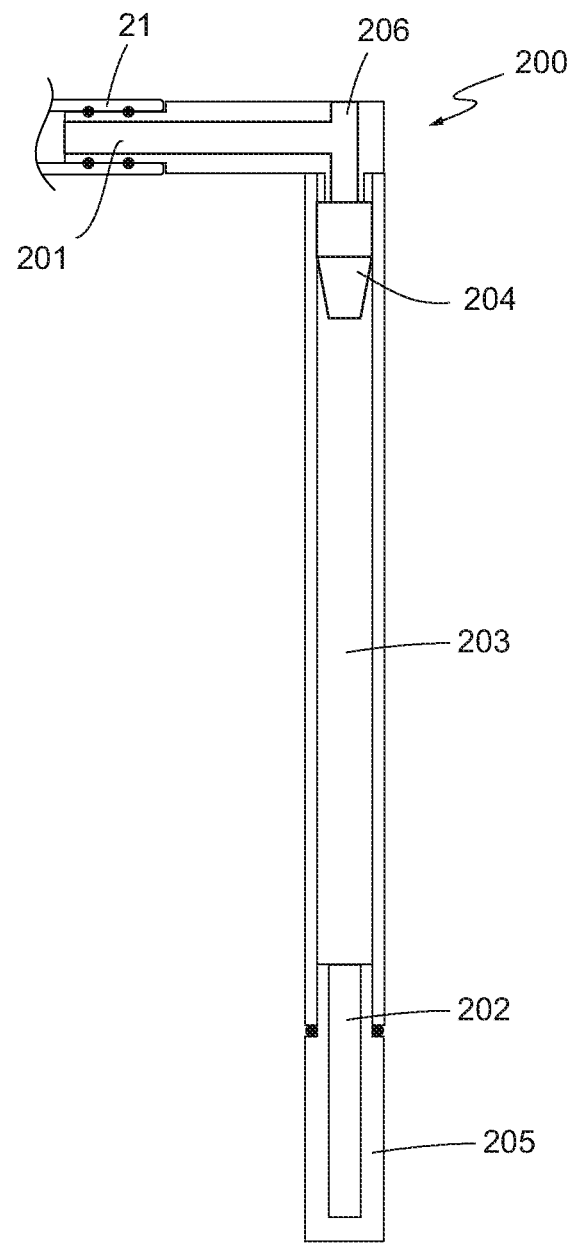
FIG. 15 shows a cross-section of an aerator according to an aspect of the invention.

FIG. 15 shows an embodiment of an aerator 200 according to an aspect of the invention. The aerator 200 comprises an inlet 201 for connecting to a dual-use vacuum pump. The dual-use vacuum pump preferably not only has a vacuum mode in which it sucks air towards the pump, but has also a blowing mode in which it blows air out of the pump. When using the aerator, it is beneficial to have the vacuum pump operating in blowing mode, such that the pump can blow air through the aerator into or towards the liquid to be aerated.

The aerator 200 further has an outlet 202 with a channel 203 between the inlet 201 and the outlet 202. At the inlet 201 a coupling element 21 of the vacuum pump can be connected. Air can be blown in via the inlet 201, and then flows through the channel 203 towards the outlet 202. At the outlet 202, a filter 205 can be provided to diffuse air that is blown out of the aerator 200. Diffused air allows to better aerate the liquid, e.g. may allow creating foam out of some liquids, such as milk. The inlet 201 here extends in a direction transverse to the channel 203, such that it can be relatively easy handled by a user. The aerator 200 is in this example hook-shaped have a first leg comprising the inlet 201 and a second leg comprising the outlet 202. Advantageously, the angle of the hook may be between about 65 degrees and about 115 degrees, advantageously about 90 degrees. This facilitates the handling of the aerator by a hand of a user. The user may thus manipulate the aerator in a more easy way, as well as the control of the opening 206 may be easier. Further, by providing the hook-shaped aerator 200, it can be prevented that the aerator 200 may fall into the receptacle, such as a bottle or a flask.

Advantageously in the channel 203 a one-way valve 204 is provided. As such, liquid can be prevented to enter towards the vacuum pump via the channel 203 of the aerator 200. Further, in the channel 203, and upstream of the one-way valve 204, when a one-way valve is present, a further opening 206 can be provided, which opening 206 provides for direct fluid connection of the channel 203 with the environment outside of the aerator 200. The opening 206 can be closed upon intervention from a user, e.g. by a finger of the user. Advantageously, the opening 206 is located near the corner of the hook-shaped aerator 200. Alternatively, when the aerator 206 is e.g. straight or curved, the opening 206 is preferably relatively close to the inlet 201, such that it can be opened and/or closed by a finger of a user to control the aeration of the liquid. When a one-way valve 204 is present in the channel 203, the opening 206 is advantageously provided between the inlet 201 and the one-way valve 204.

The filter can be provided at the end of the tube forming the channel 203 or the filter can be a separate element removable connectable to the tube. The filter can be provided as a number of openings or holes, or very small mesh-like protrusions, etc. The filter 205 can be a steel mesh filter or a plastic mesh filter having meshes in an order of magnitude of microns, for example between about 1 micron to about 50 micron, for example between about 3 micron and about 5 micron. Thus, very small air bubbles can be generated so that the liquid can be relatively smoothly aerated.

Figures 16A, 16B:
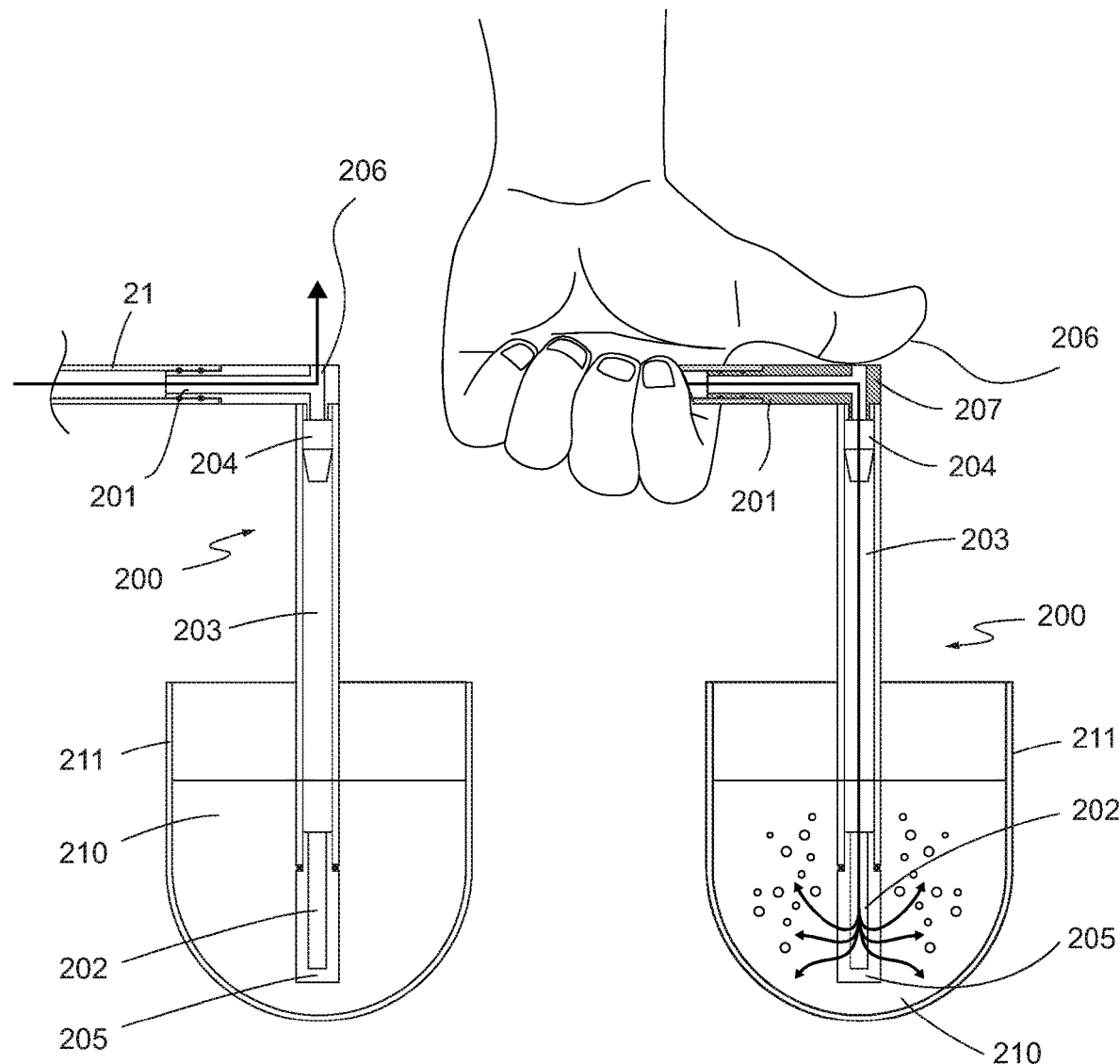
FIG. 16a shows the air flow through the aerator with the opening open.
FIG. 16b shows the air flow through the aerator with the opening closed.

Advantageously, the inlet 201 extends transversely to the direction of the channel 203, wherein the channel 203 preferably is a straight channel 203. The opening 206 preferably is provided at an end 207 of the channel 203 opposite the outlet 202. As such, the channel 203 preferably extends between the end 207 and the outlet 202. At the end 207, the inlet 201 is provided extending transversely with respect to the channel 203. The end 207 can be arranged as a corner of a hook-shaped aerator 200 having two legs, a first leg comprising the inlet 201, and a second leg comprising the outlet 202. Advantageously, the first leg having the inlet 201 is about perpendicular oriented with respect to the second leg having the outlet 202 which allows easy handling of the aerator by a single hand of a user, as illustrated in FIG. 16b. Further, at the end 207, the opening 206 is provided, such that the user can not only relatively easy handle the inlet 201 but also with a single hand can operate the opening 206 for opening or closing it with a finger. This allows for ease of use, and ease of control of the way of aerating. Additionally and/or alternatively, the user can also control the way of aerating by submerging the filter more or less in the liquid.

The aerator 200 may be assembled from multiple separate components, e.g. the first leg, the second leg, the filter all can be separate components that can be removable connected to each other. This provides for more easy assembly, but also allows for relatively easy de-assembly and cleaning of the individual components.

FIG. 16a and FIG. 16b show the use of the aerator 200 with the free end 202 thereof submerged in the liquid to be aerated. The liquid 210 is contained in a receptacle 211. The free end 202 of the aerator 200 comprised with the filter 205 is submerged, for example, the entire filter 205 is submerged. The filter 205 can be fully or partially submerged, by partially submerging the filter 205, the user may also control the aeration of the liquid. Also, even liquid with a low liquid level can be aerated, as aeration is also possible with the filter 205 only partially submerged.

In FIG. 16a the opening 206 is open, and with the vacuum pump operating in blowing mode, air is blown into the environment via the opening 206. When the opening 206 is closed, as seen in FIG. 16b, air is blown by the vacuum pump through the one-way valve 204 towards the outlet 202 and the filter 205 into the liquid 210 to aerate the liquid. By providing the opening 206 that the user can open or close at its own convenience, the user itself can control the way of aerating the liquid, e.g. the user can control the amount of air blown towards the one-way valve by partially closing the opening 206, or can determine the intensity e.g. by intermittently opening and closing the opening 206.

The aerator is specifically intended for blowing air only, and is not intended for distributing liquid into a bowl with liquid. Preferably, the filter is sufficiently fine-meshed to allow air to pass through, but liquid not. To that end, the meshes are preferably as small as between about 1 micron to about 10 micron, preferably between about 3 micron and about 5 micron. The aerator is arranged only for connection to a pump that can blow air to the aerator, preferably a dual-use vacuum pump that is provided with a blowing mode. There is disclosed a stand-alone, independent and re-usable valve that can be mounted to a conventional food container, such as a food bag, and can be coupled to a suction pump. The valve has a base part for insertion into the food container and a top part for mounting onto the base part with a wall of the food container in between, to obtain an air-tight closure of the valve. Further, an adapter is provided that can cooperate with a single type of coupling element for a suction pump at one end and can cooperate with various types of valves at another end. Additionally, an aerator is provided that can be coupled to a suction pump operating in a blowing mode for aerating liquid.

The wording 'food container', or 'container', does not exclude any receptacle, bag, bottle, flask, jar, etc. for containing food. The wording 'vacuum pump' does not exclude any suction pump and/or blowing pump that is configured for use in a kitchen in combination with a food container.

For the purpose of clarity and a concise description, features are described herein as part of the same or separate embodiments, however, it will be appreciated that the scope of the claims and disclosure may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope defined in the following claims

The invention claimed is:

1. An aerator for aerating liquid, wherein the aerator is configured for cooperation with a dual-use vacuum pump, the aerator comprising:
   a cooperation element that is arranged for connection to the dual-use vacuum pump;
   a tube connected to the cooperation element at one end and ending at another, free end having an outlet, wherein the free end is configured for at least partly submerging in the liquid such that air can flow out of the outlet to the liquid,
wherein the aerator further comprises an opening positioned between the cooperation element and a one-way valve, wherein the opening provides for a fluid connection between the tube and an environment outside of the aerator.

2. The aerator according to claim 1, wherein the one-way valve is arranged in the tube.

3. The aerator according to claim 1, wherein the outlet is configured as a filter to diffuse air blown through the aerator.

4. The aerator according to claim 3, wherein the filter is provided as a filter element that is removable and connectable to the free end of the tube.

5. The aerator according to claim 1, wherein the tube is hook-shaped having two legs, with the cooperation element provided at a first leg of the hook, and the free end provided at a second leg of the hook.

6. The aerator according to claim 5, wherein the opening is provided at a junction of the first leg and the second leg of the hook.

7. The aerator according to claim 1, wherein the tube of the aerator is between about 5 cm and about 25 cm.

8. A system of a suction pump and the aerator according to claim 1.

9. The aerator according to claim 5, wherein the opening is provided in the first leg of the hook.

10. The aerator according to claim 7, wherein the tube of the aerator is between about 10 cm and about 15 cm.

11. The system of claim 8, wherein the suction pump is a vacuum pump.

12. The system of claim 11, wherein the vacuum pump is a dual-use vacuum pump.

* * * * *